United States Patent
Rapp et al.

(10) Patent No.: US 11,773,272 B2
(45) Date of Patent: Oct. 3, 2023

(54) HIGHLY FLUORINATED NANOSTRUCTURED POLYMER FOAMS FOR PRODUCING SUPER-REPELLENT SURFACES

(71) Applicant: Glassomer GmbH, Freiburg im Breisgau (DE)

(72) Inventors: Bastian Rapp, Karlsruhe (DE); Dorothea Helmer, Karlsruhe (DE); Christiane Richter, Eggenstein-Leopoldshafen (DE); Nico Keller, St. Leon-Rot (DE)

(73) Assignee: Glassomer GmbH, Freiburg im Breisgau (DE)

( * ) Notice: Subject to any disclaimer, the term of this patent is extended or adjusted under 35 U.S.C. 154(b) by 62 days.

(21) Appl. No.: 17/681,325

(22) Filed: Feb. 25, 2022

(65) Prior Publication Data
US 2022/0389232 A1     Dec. 8, 2022

Related U.S. Application Data

(62) Division of application No. 16/339,825, filed as application No. PCT/EP2017/001171 on Oct. 4, 2017, now abandoned.

(30) Foreign Application Priority Data

Oct. 6, 2016   (DE) .......................... 102016012001.0

(51) Int. Cl.
   *C08F 220/22*     (2006.01)
   *C09D 5/00*       (2006.01)
   (Continued)

(52) U.S. Cl.
   CPC .............. *C09D 5/00* (2013.01); *C08F 220/22* (2013.01); *C08J 9/12* (2013.01); *C08J 9/286* (2013.01);
   (Continued)

(58) Field of Classification Search
   CPC ...... C09D 5/00; C09D 133/16; C09D 135/02; C08F 220/22; C08J 9/12; C08J 9/286;
   (Continued)

(56) References Cited

U.S. PATENT DOCUMENTS

| | | |
|---|---|---|
| 5,554,414 A | 9/1996 | Moya et al. |
| 6,503,958 B2 | 1/2003 | Hughes et al. |

(Continued)

FOREIGN PATENT DOCUMENTS

| | | |
|---|---|---|
| CN | 104231211 A | 12/2014 |
| CN | 105418837 A | 3/2016 |

(Continued)

OTHER PUBLICATIONS

Translation of CN 105418837 by Xiao et al. (Year: 2016).*

(Continued)

*Primary Examiner* — Michael M Dollinger
*Assistant Examiner* — Christina H. W. Rosebach
(74) *Attorney, Agent, or Firm* — McDonnell Boehnen Hulbert & Berghoff LLP

(57) ABSTRACT

The present invention relates to a highly fluorinated nanostructured polymer foam as well as to its use as a super-repellent coating of substrates. Furthermore, the present invention relates to a composition and to a method for producing the highly fluorinated nanostructured polymer foam.

14 Claims, 3 Drawing Sheets

(51) Int. Cl.
*C08J 9/28* (2006.01)
*C09D 133/16* (2006.01)
*C09D 135/02* (2006.01)
*C08L 33/16* (2006.01)
*C08J 9/12* (2006.01)

(52) U.S. Cl.
CPC ............ *C08L 33/16* (2013.01); *C09D 133/16* (2013.01); *C09D 135/02* (2013.01); *C08J 2201/026* (2013.01); *C08J 2201/0502* (2013.01); *C08J 2205/042* (2013.01); *C08J 2205/044* (2013.01); *C08J 2205/052* (2013.01); *C08J 2300/102* (2013.01); *C08J 2333/16* (2013.01); *C08J 2335/02* (2013.01)

(58) Field of Classification Search
CPC .............. C08J 2201/026; C08J 2201/05; C08J 2205/042; C08J 2205/044; C08J 2205/052; C08J 2300/102; C08J 2333/16; C08J 2333/02; C08L 33/16
See application file for complete search history.

(56) References Cited

U.S. PATENT DOCUMENTS

| | | | |
|---|---|---|---|
| 7,615,283 | B2 | 11/2009 | Radcliffe et al. |
| 7,985,475 | B2 | 7/2011 | Dubrow |
| 8,017,234 | B2 | 9/2011 | Jin et al. |
| 8,137,751 | B2 | 3/2012 | Bhushan et al. |
| 8,741,158 | B2 | 6/2014 | Aytug et al. |
| 2002/0150723 | A1 | 10/2002 | Oles et al. |
| 2006/0024508 | A1 | 2/2006 | D'Urso et al. |
| 2006/0029808 | A1 | 2/2006 | Zhai et al. |
| 2006/0246297 | A1 | 11/2006 | Sakoske et al. |
| 2010/0004373 | A1 | 1/2010 | Zhu et al. |
| 2011/0229667 | A1 | 9/2011 | Jin et al. |
| 2011/0263751 | A1 | 10/2011 | Mayer et al. |
| 2013/0108816 | A1 | 5/2013 | Zerafati |
| 2016/0005506 | A1 | 1/2016 | Isaka et al. |

FOREIGN PATENT DOCUMENTS

| | | |
|---|---|---|
| EP | 0 216 622 A2 | 4/1987 |
| JP | 2015-034255 A | 2/2015 |
| WO | 97/35904 A1 | 10/1997 |
| WO | 2009/118552 A1 | 10/2009 |
| WO | 2010/018744 A1 | 2/2010 |
| WO | 2012/012441 A1 | 1/2012 |

OTHER PUBLICATIONS

Translation of JP 2015-034255 by Kaida et al. (Year: 2015).*
International Search Report, from the European Patent Office, for International Patent Application PCT/EP2017/001171, dated Dec. 15, 2017, pp. 1-5. (Translation attached).
Deng, Xu, et al., "Candle Soot as a Template for a Transparent Robust Superamphiphobic Coating", Science, Jan. 3, 2012, vol. 335(6064), pp. 67-70, DOI:10.1126/science.1207115. (Abstract only).
Jin, H., et al., "Preservation of Superhydrophobic and Superoleophobic Properties Upon Wear Damage", Applied Materials & Interfaces, Feb. 2013, vol. 5(3), pp. 485-488, doi:10.1021/am302541f, Epub Jan. 30, 2013. (Abstract only).
Li, Y., et al., A Facile Layer-by-Layer Deposition Process for the Fabrication of Highly Transparent Superhydrophobic Coatings, Chemical Communications, May 21, 2009, vol. 19, pp. 2730-2732, doi: 0.1039/b900804g, Epub Mar. 27, 2009. (Abstract only).
Perro, Adeline, et al., "Synthesis of Hybrid Colloidal Particles: From Snowman-Like to Raspberry-Like Morphologies", Colloids and Surfaces A: Physicochemical and Engineering Aspects, Aug. 15, 2006, vols. 284-285, pp. 78-83. (Abstract only).
Shafiei, M. and Alpas, A.T., "Nanocrystalline Nickel Films with Lotus Leaf Texture for Superhydrophobic and Low Friction Surfaces", Applied Surface Science, Nov. 15, 2009, vol. 256(3), pp. 710-719. (Abstract only).
Taurino, R., et al., Facile Preparation of Superhydrophobic Coatings by Sol-Gel Processes, Journal of Colloid and Interface Science, Sep. 1, 2008, vol. 325(1), pp. 149-156, doi:10.1016/j.jcis.2008.05.007, Epub Jun. 20, 2008. (Abstract only).
Vogelaar, Laura, et al., "Superhydrophobic Surfaces Having Two-Fold Adjustable Roughness Prepared in a Single Step", Langmuir, Mar. 28, 2006, vol. 22(7), pp. 3125-3130, DOI:10.1021/la052701l. (Abstract only).
Translation of the International Preliminary Report on Patentability and Written Opinion, from the International Bureau of WIPO, for PCT/EP2017/001171, dated Apr. 9, 2019, pp. 1-15.
Jarvis, N.L. and Zisman, W.A., "Surface Chemistry of Fluorochemicals", U.S. Naval Research Laboratory, Oct. 21, 1965, NRL Report 6324, pp. 1-37.
German Language Search Report from the European Patent Office, dated Mar. 19, 2021, for European Patent Application No. 17784843.9, pp. 1-6.
Bernett, M.K. and Zisman, W.A., "Wetting Properties Of Tetrafluoroethylene and Hexafluoropropylene Copolymers", J. Phy. Chem., 1960, vol. 64, pp. 1292-1294.
Lee, S., et al., "The Wettability of Fluoropolymer Surfaces: Influence of Surface Dipoles", Langmuir, 2008, vol. 24, pp. 4817-4826.
Gangal, S.V. and Brothers, P.D., "Perfluorinated Polymers, Perfluorinated Ethylene-Propylene Copolymers", Encyclopedia of Polymer Science and Technology, 2010, pp. 1-15.
SciFinder pvdf, CAS Registry No. 24937-79-9, American Chemical Society, 2020, pp. 1-9.

* cited by examiner

HIGHLY FLUORINATED NANOSTRUCTURED POLYMER FOAMS FOR PRODUCING SUPER-REPELLENT SURFACES

CROSS-REFERENCE

This application is a divisional of U.S. patent application Ser. No. 16/339,825, filed Apr. 5, 2019, which is a section 371 U.S. National phase of PCT/EP2017/001171, filed Oct. 4, 2017 which claims priority from German patent application no. 10 2016 012 001.0, filed Oct. 6, 2016, all which are incorporated by reference in its entirety.

FIELD OF INVENTION

The present invention relates to a highly fluorinated nanostructured polymer foam as well as to its use as a super-repellent coating of substrates. Furthermore, the present invention relates to a composition and to a method for producing the highly fluorinated nanostructured polymer foam.

BACKGROUND OF THE INVENTION

Super-repellent surfaces are surfaces, from which both water as well as oils and organic solvents pearl off. Accordingly, they are both hydrophobic as well oleophobic.

Applications include super-repellent surfaces, among other things, in the form of technical surface coatings, glass coatings, and fabric coatings and are used in the outdoor industry, automotive industry and pharmaceutical industry, among others.

Thereby, the contact angle, which a drop of the liquid forms on this surface, is used as a measure of the wettability of a surface with a liquid. Hydrophobic surfaces have a contact angle of water >90°, wherein super-hydrophobic surfaces have a contact angle of water >140°. Analogously, it applies to oleophobic surfaces that they have a contact angle of oils >90°, wherein super-oleophobic surfaces have a contact angle of >140°. In order to achieve such a contact angle on a surface, a reduction of the free surface energy of each surface is required. The reason for this lies in conjunction with the contact angle, as it is expressed in Young's equation (1):

$$\cos\theta = \frac{\gamma_{gas/solid} - \gamma_{liquid/solid}}{\gamma_{gas/liquid}} \approx \frac{\gamma_{solid} - \gamma_{liquid/solid}}{\gamma_{liquid}} \quad (1)$$

wherein θ is the contact angle forming and the respective γ represents the free surface energies of the three boundary surfaces between the surrounding gas atmosphere ("gas"), liquid ("liquid") and substrate surface ("solid"). Thereby, the free surface energies on the boundary surface gas/surface and gas/liquid can be approximated by the free surface energies of the surface and the liquid. These values can either be measured or taken from the tables. Only the variable $\gamma_{liquid/solid}$ must be approximated using an appropriate model, wherein, here, the model of Fowkes has proven to be true, adopting the following expression (2) for $\gamma_{liquid/solid}$:

$$\gamma_{liquid/solid} = \gamma_{liquid} + \gamma_{solid} - 2\sqrt{\gamma_{liquid} \cdot \gamma_{solid}} \quad (2)$$

If you combine equations (1) and (2), you get:

$$\cos\theta = \frac{\gamma_{solid} - \gamma_{liquid/solid}}{\gamma_{liquid}} = \frac{\gamma_{solid} - (\gamma_{liquid} + \gamma_{solid} - 2\sqrt{\gamma_{liquid} \cdot \gamma_{solid}})}{\gamma_{liquid}} \quad (3)$$

$$\cos\theta = \frac{-\gamma_{liquid} + 2\sqrt{\gamma_{liquid} \cdot \gamma_{solid}}}{\gamma_{liquid}}$$

If a surface should repel a liquid, then the contact angle in marginal cases must be >90°. The cosine for θ>90 is negative, therefore, the following results for equation (3):

$$\frac{-\gamma_{liquid} + 2\sqrt{\gamma_{liquid} \cdot \gamma_{solid}}}{\gamma_{liquid}} < 0 \quad (4)$$

$$2\sqrt{\gamma_{liquid} \cdot \gamma_{solid}} < \gamma_{liquid}$$

$$4 \cdot \gamma_{solid} < \gamma_{liquid}$$

$$\gamma_{solid} < \frac{1}{4} \cdot \gamma_{liquid}$$

From equation (4), it is evident that a surface with a free surface energy of less than a fourth of the free surface energy of the liquid becomes repellent for this liquid. In accordance with this, water with a free surface energy of 71 mN/m is repelled on surfaces with less than 17 mN/m. For oils and organic solvents with free surface energies within a range of 20 to 25 mN/m, surfaces are required that have free surface energies of at most or 5 mN/m.

A reduction of the free surface energy can be achieved through use of highly fluorinated materials. However, in addition, a micro- or nanoscale roughness is required, which ensures that air is held at the surface. The latter is required since the wetting model according to Young is based on a three-phase system. If the air is driven away from the surface, Young's equation is no longer valid, and the super-repellent effect of the surface is lost despite its low level of free surface energy. Accordingly, surfaces, from which both water as well as oils and organic solvents should pearl off, must have both a sufficiently low level of free surface energy, as well as an appropriate micro- or nanoscale roughness.

In the prior art, examples are known in which porous highly fluorinated substrates are produced by means of separating functionalized nanoparticles. These nanoparticles are fluorinated at a first step, for example, by means of a silanization under the use of appropriate perfluoroalkylsilanes. Thereby, the particles form substrates, which have cavities with suitable pore diameters similar to a bulk powder. Examples of this can be found in WO 2009/118552 A1. The production of these particles by means of an electro-spray method in situ is also described in the prior art, for example, in US 2006/0246297 A1.

Frequently, rough surfaces are produced by means of electropolymerization. Thereby, sometimes directly fluorinated monomers can also be used. Examples of electropolymerized substrates can be found in US 2006/0029808 A1.

Another method for producing surfaces with a sufficient micro- or nano-roughness exists in the anionic etching of metal surfaces. This method is among the first approaches, with which super-repellent surfaces have been produced. Examples for this are described by Shafiei and Alpas (Applied Surface Science 2009, 256, 710-719).

Another method with which sufficiently porous structures can be produced include sol-gel approaches, as is described by Taurino et al. (Journal of Colloid and Interface Science 2008, 325, 149-156).

Mixtures of polymer matrices and fluorinated nanoparticles are known from the prior art. Examples for this can be found in U.S. Pat. No. 8,017,234 B2, US 2011/0263751 A1, US 2010/0004373 A1 and WO 2010/018744 A1. Sometimes, nanoparticles can be subsequently introduced by means of a solvent process into a polymer coating previously applied onto the surface. For example, such a method is described in US 2002/0150723 A1.

Furthermore, methods are known in the prior art, which initially provide for the creation of a microstructure, which is coated with a nanostructure at a second step. Furthermore, creating such hierarchical structures is possible, for example, via a material separation or via a selective material removal on or from a microstructure produced at a first step. The structures are mostly fluorinated at a post-treatment step. Examples of such methods can be found in U.S. Pat. No. 8,137,751 B2 and in WO 2012/012441 A1.

It is also possible to introduce a second structural level onto particles, as described for example by Perro et al. (Colloids and Surfaces A: Physicochemical and Engineering Aspects 2006, 284-285, 78-83). This produces particles that have a defined surface structure. Due to the combination of the particles which form the first structural level and the structure applied to the particles, which form the second structural level, super-repellent surfaces can be produced. Mostly, these particles must then be fluorinated at a subsequent step.

Approaches are also described where a substrate consists of two materials, which can be selectively etched. Thereby, mostly at a first step, a coating compound consisting of two materials is applied and, at a second step, one of the two materials is selectively removed using a suitable etching agent. In this way, a super-repellent surface can also result. Examples for this are described in U.S. Pat. No. 8,741,158 B2. The coatings are sometimes also applied to a previously produced microstructure. Examples of this can be found in US 2006/0024508 A1. A modification of this method uses a mixture of an inorganic matrix, for example, silica, and an organic matrix, usually a polymer, which can be applied together by means of dip-coating. Then, the substrate is heated, and the organic matrix is burned out. At the same time, the inorganic matrix calcines and then forms a porous glass-like structure. At a second step, this can be fluorinated, for example, by means of silanization under the use of suitable perfluoroalkylsilanes, whereby a super-repellent coating results. Examples of this method are described by Li et al. (Chemical Communications 2009, 2730-2732).

Another variant for producing super-repellent surfaces entirely via calcination is described by Deng et al. (Science 2012, 335, 67-70). Here, via soot separation, a surface with a suitable roughness is produced, which is covered with a silane at a next step by means of a gas-phase separation, said silane being subsequently calcinated. A sufficiently low-energy surface is then created on the micro- or nanoscale rough surface by means of gas-phase fluorination.

In addition to producing super-repellent surfaces based on nanoparticles, there are also examples for producing corresponding surfaces under the use of nanowires, which can, for example, be produced by means of gas-phase separation or electrospinning. These nanowires can be functionalized at a second step by means of a gas-phase process, thereby being fluorinated. Examples of this can be found in US 2011/0229667 A1 and U.S. Pat. No. 7,985,475 B2.

Methods are also known in the prior art, which structure a highly fluorinated substrate, for example, a fluoropolymer, by means of replication technology, thereby introducing the required level of roughness. Examples for this are described by Vogelaar et al. (Langmuir 2006, 22, 3125-3130).

The aforementioned methods from the prior art accordingly follow either a "top-down approach" or a "bottom-up approach" for the most part.

In the case of the "top-down approaches", nanostructured surfaces with a sufficiently low level of free surface energy are generated by means of a replication process. Here, a nanostructured mold tool is copied into a material with a sufficiently low level of free surface energy. In the case of these approaches, consequently, a pre-existing coating of a material is structured with a low level of free surface energy, typically a fluoropolymer "from above", These approaches are particularly disadvantageous due to the fact that the replication usually only reaches a very low penetration depth, and thus a low effect depth. By effect depth, the substrate thickness is understood to be that on which the super-repellent effect acts. Thereby, it essentially has to do with magnitudes within a range of less than 10 to 100 μm. Furthermore, in the case of these approaches, thermoplastic fluoropolymers are used since the required mechanical restructuring can only take place if the polymer network is not chemically cross-linked. Since thermoplastic fluoropolymers are generally very soft, the structured surfaces obtained in this manner have a very high level of mechanical susceptibility.

In contrast, in the case of "bottom-up approaches", a surface with a suitable roughness is firstly produced in any material by means of a suitable method. At a second method step, this surface is changed with regard to its free surface energy in such a way that the surface becomes repellent. Frequently, this second step is a gas-phase functionalization, for example, a fluorination. Here, for example, fluorinated silanes are available as suitable reagents, which are applied onto the surface in the fluid phase by means of vaporization or sampling. These approaches are disadvantageous due to the roughness of the created surface frequently also having a limited effect depth. Thus, for example, a thickness of a few micrometers can, for example, be achieved by means of separating nanoparticles. Thicker coatings frequently become mechanically instable. They are inclined to form cracks or become light-diffusing, meaning opaque. In particular, in the case of "bottom-up approaches", the second method step represents the limiting factor. The subsequent functionalization, which is usually a fluorination, only reaches a limited penetration depth. Thus, vapor-phase processes only allow for a certain insertion and removal of reagents, for example, into a nanostructure or out of a nanostructure. Thereby, the limiting represents the mass and diffusion transport within the structure. Therefore, also here, the effect depth is limited to a few micrometers.

In the case of "bottom-up approaches", the same problem accordingly arises as in the case of "top-down approaches": The limited effect depth does not allow for surfaces to be produced that are sufficiently mechanically stable for practical applications. Also here, a simple scratching with a key or with a fingernail would remove the functional structure of the surface and destroy the super-repellent effect. Due to the fact that nanoscale structures, particularly if they are composed of adsorbing or self-assembled particles, comprise a very low level of mechanical stability, the coatings obtained by the "bottom-up approaches" are mostly still less robust than the structures produced by means of "top-down approaches".

In the case of the method described in the prior art, according to this, the super-repellent effect is limited to the depth that can be structured within the scope of the corresponding "top-down approach" or "bottom-up approach". If the super-repellent surface is exposed to mechanical burdens such as abrasion, for example, due to weather impact, a material erosion gradually occurs in the magnitude of the effect depth, wherein the super-repellent characteristic of the surface is ultimately lost completely.

SUMMARY OF THE INVENTION

The object of the present invention is to provide a highly fluorinated nanostructured polymer foam for producing super-repellent surfaces, wherein the super-repellent characteristic of the polymer foam should not be limited to its surface but should be maintained within its entire surface thickness.

This object is solved by means of the embodiments of the present invention that are characterized in the claims.

DETAILED DESCRIPTION OF THE INVENTION

In particular, according to the invention, a highly fluorinated nanostructured polymer foam is provided, which has a density of at most or ≤22 g/mL as well as a free surface energy of at most or ≤12 mN/m, wherein the fluorine content is at least or ≥20 mol %. Furthermore, the highly fluorinated nanostructured polymer foam has homogeneously distributed cavities with dimensions of at most or ≤5 μm across the entire volume. Furthermore, according to the invention, the highly fluorinated nanostructured polymer foam has an at least or ≥1% lower density than the unstructured or unfoamed bulk polymer, thereby having an absolute foam expansion of at least or ≥1%.

Figure 1:
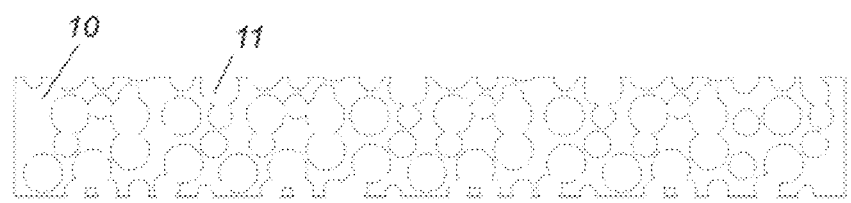
FIG. 1 shows the structure of the polymer foam according to the invention. A fluorinated polymer matrix (10) is permeated by a network of cavities that is filled with air (11). The result is a "fluorinated sponge", which has a high level of roughness on its surface.

The polymer foam according to the invention is suitable as a surface coating for substrates and gives this super-repellent characteristics. Since the effect depth, meaning the depth, within which the nanostructuring is present, is identical to the overall thickness of the coating, it does not have to do with a surface but with a volume effect, as can be seen in FIG. 1. Only when the entire coating is fully removed does the substrate lose its super-repellent effect. A slight abrasion of the polymer foam even regenerates the super-repellent effect since a new coating with a corresponding surface roughness is uncovered.

According to the invention, the highly fluorinated nanostructured polymer foam has a free surface energy of at most or ≤12 mN/m, preferably of at most or ≤10 mN/m, and being particularly preferred, of at most or ≤5 mN/m. Due to the cavity structure and the surface roughness caused thereby, the effective contact surface is reduced to the extent that the polymer foam according to the invention is already super-repellent at free surface energies of 12 mN/m. In accordance with this, substrates coated with the polymer foam according to the invention are both repellent against water as well as against oils and organic solvents. The free surface energies are measured according to the invention under the use of the OWRK method in accordance with DIN55660-2 by means of a commercial contact angle measurement device (type: OCA-15, Data Physics). Water and diiodomethane are used as liquids.

The low level of free surface energy of the polymer foam according to the invention is achieved by means of a fluorine content of at least or ≥20 mol %, preferably of at least or ≥30 mol % and, being particularly preferred, of at least or ≥40 mol %, with reference to the chemical composition of the polymer foam. The remaining fabric quantities thereof, in particular, are allotted to carbon, hydrogen, and if applicable, oxygen, wherein the chemical composition of the polymer foam is not limited to those elements.

Typically, at least or ≥20%, preferably at least or ≥30% and being particularly preferred, at least or ≥40% of the fluorine atoms contained in the polymer foam according to the invention are present as $CF_3$ groups since these make lower levels of free surface energies possible in comparison to $CF_2$ groups and CF groups. The remaining fluorine content is preferably present as $CF_2$-groups.

Furthermore, a porous structure of the polymer foam is required to achieve the super-repellent characteristic, which ensures the surface roughness in order to keep sufficient air at the surface. By means of this, it is ensured that the three-phase system is fulfilled according to Young's equation, whereby, in connection with the low level of free surface energy, contact angles for water as well as for oils and organic solvents of θ>90 are obtained. According to the invention, the porous structure of the polymer foam is characterized in that cavities with dimensions of at most or ≤5 μm, preferably of at most or ≤500 nm and, being particularly preferred, of at most or ≤50 nm are homogeneously distributed within the entire volume of the polymer foam.

Within the scope of the present invention, the term "nanostructured" is understood in such a way that the cavities of the polymer foam according to the invention do not necessarily have dimensions only within the nanometer range even though such nanoscale dimensions are preferred.

In accordance with this, the polymer foam according to the invention is highly fluorinated and nanostructured, wherein those characteristics are not limited to the surface of the polymer foam. Consequently, it concerns a volume effect.

Due to the homogeneously distributed cavities within the entire volume of the polymer foam according to the invention, the density of the polymer foam is at most or ≤2.2 g/mL, preferably at most or ≤1.8 g/mL, and, being particularly preferred, at most or ≤1.5 g/mL. The highly fluorinated nanostructured polymer foam has at least or ≥1%, preferably at least or ≥10% and, being particular preferred, at least or ≥20% less density than the unstructured or unfoamed bulk polymer, which is free of cavities. Consequently, the polymer foam according to the invention has an absolute foam expansion of at least or ≥1%, preferably of at least or ≥10%, and being particularly preferred of at least or ≥20%. The thickness difference and the absolute foam expansion can be understood as a measure for the porosity of the polymer foam according to the invention.

According to the invention, the density of the polymer foam is measured on standard bodies with a diameter of 1 cm and thickness of 3 mm. Thereby, the weight of the polymer foam is determined using a high-precision scale.

Since the polymer foam according to the invention can comprise cavities, the dimensions of which are smaller than the wavelength of the visible spectrum, the polymer foam appears to be optically transparent if applicable. In an embodiment of the present invention, the polymer foam has a transmission of at least or ≥50% within the wavelength range spanning from 400 to 800 nm at a thickness of 0.25 mm, preferably of at least or ≥70%, and, being particularly preferred, of at least or ≥90%. Here, the measurement of the transmission takes place using an Evolution-201-type UV/VIS spectrometer (Thermo Scientific, Germany) on samples with a thickness of 0.25 mm.

In another aspect, the present invention relates to a composition for producing the highly fluorinated nanostructured polymer foam according to the invention, comprising the following components:
 at least one monomer, which can be polymerized by supplying heat or light, wherein the fluorine content of the at least one monomer is at least or ≥20 mol %;
 a polymerization initiator which initiates the polymerization of the at least one monomer by supplying heat or light; and
 a non-polymerizable porogen.

The highly fluorinated nanostructured polymer foam according to the invention described in the above can be produced using the composition according to the invention.

The at least one monomer of the composition according to the invention is at room temperature, meaning at a temperature of 20° C. in liquid form. In this connection, the presence in liquid form means that the at least one monomer has either a liquid physical state or it has been dissolved in a liquid porogen. Examples for such a porogen include long-chained saturated and unsaturated non-, partially or perfluorinated alkanes and carboxylic acids.

The fluorine content of the at least one monomer is at least or ≥20 mol %, preferably at least or ≥30 mol % and, being particularly preferred, at least or ≥40 mol %, with reference to the atomic composition of the at least one monomer. An upper fluorine limit is only given by the maximum fluorination capacity and is therefore merely a technical issue. In principle, a highest possible fluorination is preferred.

Typically, at least or ≥20%, preferably at least or ≥30%, and being particularly preferred, at least or ≥40% of the fluorine atoms of the at least one monomer is present as $CF_3$ groups since these make lower levels of free surface energies possible in comparison to $CF_2$ groups and CF groups. The remaining fluorine content is preferably present as $CF_2$-groups.

The at least one monomer can be polymerized by supplying heat or light when a polymerization initiator is present. In accordance with this, the at least one monomer according to the invention comprises one or a plurality of functional group(s) that is/are suitable for a polymerization, such as at least one double bond or at least two functional groups, such as hydroxyl or carboxyl, which allow for the formation of polyesters for example. Other functional groups, epoxide, isocynate, isothiocyanate, amino, thiol or comparable functional groups known to the person skilled in the art can be noted as non-limiting.

In the case of the presence of a plurality of polymerizable functional groups, the polymer foam obtained after polymerization can be chemically cross-linked, whereby its mechanical stability is increased. This is an advantage with regard to the comparatively soft thermoplastics which are described in the prior art. The latter have no chemical cross-linking. In an embodiment of the present invention, the composition according to the invention comprises at least one monomer, which has at least two double bonds, whereby a chemical cross-linking is possible.

The chemical structure of the at least one monomer is otherwise subject to no other limitations. In this way, the at least one monomer can comprise additional non-polymerizable functional groups, such as carbonyl, ether and/or ester groups. In addition to fluorine, the at least one monomer therefore still comprises carbon, hydrogen and, if applicable oxygen, however, it is not limited to those elements.

In an embodiment of the present invention, the composition comprises a diacrylate derivative as the at least one monomer, shown by the following general formula (I):

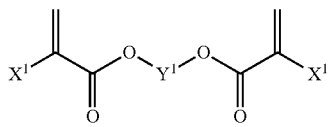

wherein $X^1$ is independently selected from the group consisting of hydrogen, methyl, monofluoromethyl, difluoromethyl and trifluoromethyl and $Y^1$ is a fluorinated saturated hydrocarbon residue which optionally comprises one or more ether groups. The molecular weight of the diacrylate derivative defined in the above is not subject to any particular limitations.

In another embodiment of the present invention, the composition comprises a monoacrylate derivative as the at least one monomer, shown by the following general formula (II):

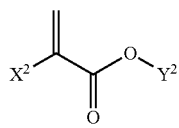

wherein $X^2$ is selected from the group consisting of hydrogen, methyl, monofluoromethyl, difluoromethyl and trifluoromethyl and $Y^2$ is a fluorinated saturated hydrocarbon residue which optionally comprises one or more ether groups. The molecular weight of the monoacrylate derivative defined in the above is not subject to any particular limitations.

While the diacrylate derivative defined in the above allows for a chemical cross-linking of the polymer foam, this naturally is not the case for the monoacrylate derivative defined in the above. If both acrylate derivatives are present in the composition according to the invention, the degree of cross-linking can be configured by selecting substance-quantity percentages thereof. In this way, the mechanical and thermal characteristics of the highly fluorinated nanostructured polymer foam according to the invention can be controlled.

The number of chemically different monomers in the composition according to the invention for producing a highly fluorinated nanostructured polymer foam is not limited in any way.

In addition to the at least one monomer, the composition according to the invention for producing a highly fluorinated nanostructured polymer foam comprises a polymerization initiator which initiates the polymerization of the at least one monomer by supplying heat or light. According to the invention, the polymerization initiator is not subject to any limitations. The composition defined in the above can comprise any polymerization initiator known in the prior art, provided it can create polymerization-inducing bonds by means of thermolytic or photolytic dissociation. Examples for polymerization initiators in the form of radical initiators, which can be activated by means of light, include azobis(isobutyronitrile) and benzoyl peroxide, while, for example, 2,2-dimethoxy-2-phenylacetophenone, phenylbis(2,4,6-trimethylbenzoyl)phosphinoxide, 2-hydroxy-4'-(2-hydroxyethoxy)-2-methylpropiophenone and 2-hydroxy-2-methylpropiophenone represent thermally activatable radical initiators. Since the supply of light can be spatially limited in a more precise manner than the supply of heat, the composition according to the invention preferably comprises a radial initiator that can be activated by means of light provided that a locally resolved polymerization of the at least ore monomer and, thereby a spatially resolved substrate coating is required.

Furthermore, the composition according to the invention comprises a non-polymerizable porogen, which does not take part in the polymerization of the at least one monomer accordingly. The porogen can be mixed with the at least one monomer. However, it is present in the cured polymer foam as a separate phase. Thereby, the porogen can consist of an individual substance or of an appropriate mixture of substances. In the case of the presence of a certain limit molecular weight, the non-polymerizable porogen carries out a phase separation, thereby structurally interrupting the polymerization process, which is also the reason the term phase former is common. The porogen separates during the polymerization within the polymer matrix, thereby forming the later cavities of the polymer foam, meaning the non-polymerizable porogen is responsible for its nanostructuring. If the polymerization is completed, the porogen evaporates during the course of time, for example, via a suitable drying process, thereby leaving behind cavities in the polymer foam required for the porous structure. Since the polymerization represents a bulk process, the phase separation also takes place in bulk, whereby the cavity structure is homogeneously distributed across the entire volume of the polymer foam, meaning the latter is uniformly porous. Consequently, corresponding cavities are also on the surface of the polymer foam, as is shown in FIG. 1, whereby the polymer foam has the surface roughness required for the super-repellent effect. Due to the cavity structure along the entire thickness of the polymer foam, the surface roughness is continuously renewed in the case of material erosion, due to abrasion for example.

Figure 2:
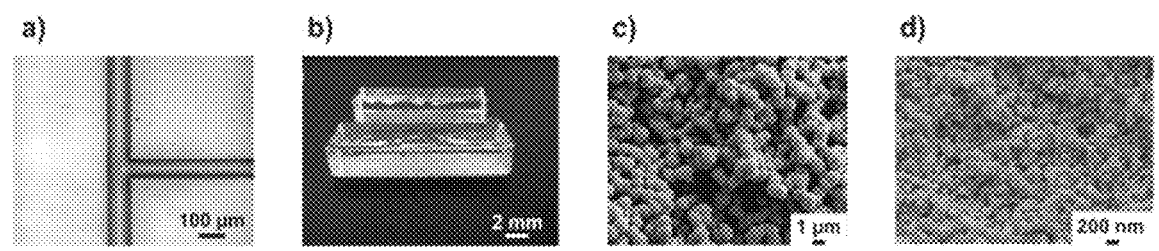
FIG. 2 shows examples of a cured polymer foam with the presence and absence of a non-polymerizable porogen. (a) Microfluidic channel structure and (b) compact polymer block (both not according to the invention). Here, the polymer foam has no porosity. Under the use of non-polymerizable porogens, a polymer foam in the form of globular structures (c) or in the form of substrates with micro- or nanoscale roughness (d) can be produced.

The amount of the non-polymerizable porogen in the composition according to the invention defines the structure, meaning the porosity of the polymer foam. FIG. 2 shows examples of polymer foams with different percentages of porogens. In an embodiment of the present invention, the volume percentage of the non-polymerizable porogen in the composition is at least or a $\geq 5\%$, preferably at least or $\geq 10\%$ and, being particularly preferred, at least or $\geq 20\%$. The porosity of the polymer foam can be specifically configured in this way.

Since the non-polymerizable porogen should be removed after completing the polymerization, for example, successively by means of evaporation in a suitable drying process in order to fill the cavities caused by it with air, such substances must be selected as porogens, which have a sufficiently high vapor pressure. By means of this, it is ensured that no elaborate removal of the porogen is required during a separate method step. Here, for example, gases come into question as porogens, such as nitrogen, oxygen or carbon dioxide, however also noble gases, such as argon, as well as other gases that do not react with the polymer matrix and the components of the composition. Saturated alcohols, such as ethanol or isopropanol, can also be used as porogens, which may be cyclic, such as cyclohexanol for example. Furthermore, ketones, such as acetone, can be used as porogen, as well as aliphatic and aromatic ethers, such as diethyl ether. Also, esters, aromatic and aliphatic hydrocarbons, but also water come into question as porogens. According to the invention, however, the non-polymerizable porogen is not limited to the aforementioned substances. The composition according to the invention may also comprise more than a non-polymerizable porogen.

In another aspect, the present invention relates to a method, for producing the highly fluorinated nanostructured, polymer foam according to the invention, comprising the following steps:
(a) curing the composition defined in the above by supplying heat or light, optionally on a substrate to be coated,
(b) optionally dipping the polymer foam obtained in this manner into a solvent; and
(c) drying the polymer foam treated in this manner,
wherein the steps (a) to (c) are optionally repeated at least once.

With the method according to the invention, the polymer foam according to the invention described in the above can be produced under the use of the composition according to the invention, optionally on a substrate to be coated.

At step (a) of the method according to the invention, the composition, comprising at least one monomer, a polymerization initiator and a non-polymerizable porogen is cured, whereby a highly fluorinated nanostructured polymer foam is obtained. For this purpose, the composition according to the invention is optionally presented or applied onto a substrate to be coated. The substrate is not subject to any limitations according to the invention and can therefore be any substrate that comes into question for a super-repellent coating.

Depending on the selection of the polymerization initiator, the curing of the composition, meaning the full polymerization of the at least one monomer, occurs by supplying heat or light. The temperature and wavelength required for the thermolytic and photolytic dissociation naturally depends on the respective polymerization initiator and can be found in the prior art.

The curing of the composition at step (a) of the method according to the invention typically takes place for a duration of at most or ≤20 minutes, preferably of at most or ≤10 minutes and, being particularly preferred, of at most or ≤1 minute. The curing period at step (a) has no influence on the thickness of the resulting polymer foam. This ultimately only depends on the provided amount of composition. However, large amounts of it principally require a longer curing period. Five seconds are mentioned as a preferred lower limit for the curing period at step (a).

If the super-repellent coating should only be applied at certain points of a substrate to be coated, the curing of the composition at step (a) preferably occurs by the supply of light since, here, curing can take place in a spatially resolved manner with a higher spatial resolution. Depending on the type of curing, whether by means of supplying light or by means of supplying heat, the person skilled in the art will select an appropriate polymerization initiator for the composition according to the invention.

At step (b) of the method according to the invention, the polymer foam obtained at step (a) is optionally dipped into a solvent, typically for a duration within a range of 15 seconds to 24 hours. The dipping serves to accelerate the subsequent drying process at step (c) since, by means of this, non-polymerizable monomer residues and the porogen can already be dissolved and roughly removed. Here, any solvent can be used as solvent, in which the monomer and/or the porogen can be dissolved. For example, an alcohol can be used, such as isopropanol or a ketone, such as acetone. The use of the non-polymerizable porogen is also possible, provided that this has to do with a liquid.

Then, at step (c) of the method according to the invention, the polymer foam optionally treated at step (b) is dried, whereby the non-polymerizable porogen is removed from the cavities of the polymer foam and those cavities are then filled with air. If the non-polymerizable porogen used, meaning the one contained in the composition according to the invention, has a sufficient vapor pressure and it is furthermore harmless with regard to health and is environmentally friendly, the drying at step (c) can occur in ambient air at ambient temperature and under ambient pressure. In particular, this applies if inert gases or alcohols, such as ethanol or isopropanol, are used as porogens.

In an embodiment of the method according to the invention, the drying at step (c) is carried out at a temperature ranging from 50 to 100° C., preferably at a temperature ranging from 60 to 90° C., and, being particularly preferred, at a temperature ranging from 70 to 80° C., preferably in a vacuum furnace. In another embodiment of the method according to the invention, drying takes place by applying a negative pressure at ambient temperature. Thereby, the pressure can be within the range of 10 to 900 mbar. By applying a negative pressure or a vacuum during drying at step (c), the evaporation process of the non-polymerizable porogen can be accelerated in this manner. At step (c), the drying duration typically ranges from 15 seconds to 120 minutes, whereby it can vary according to the amount of the originally used composition.

For the drying process at step (c), no open pores are principally required, meaning the cavities available within the polymer foam according to the invention can also be present in the form of closed pores. Thus, at a higher temperature, the non-polymerizable porogens included in the cavities can be transported to the surface of the polymer foam, which is furthermore promoted by applying a negative pressure or a vacuum.

Steps (a) to (c) of the method according to the invention for producing a highly fluorinated nanostructured polymer foam are optionally repeated at least once for example. Thereby, a polymer foam created at iteration n is used as a substrate to be coated for iteration n+1 and re-coated by means of the method according to the invention.

Using the method according to the invention, it is possible to apply the highly fluorinated nanostructured polymer foam in situ onto a substrate to be coated in order to give this super-repellent surface properties. As an alternative, a substrate to be coated for this purpose can also be provided with the finished, meaning cured and dried, polymer foam. In addition, a cured and dried polymer foam coating is applied to the substrate to be coated, for example, by means of a suitable adhesive method. Thereby, an adhesive that is suitable for fluoropolymers must be selected, for example, the at least one monomer contained in the composition used, which acts as a reactive adhesive.

In another aspect, the present invention relates to the use of the highly fluorinated nanostructured polymer foam according to the invention as a super-repellent coating of substrates, as well as the use of the composition according to the invention for providing a super-repellent coating of substrates. As mentioned in the above, according to the invention, the substrate is not subject to any limitations and can therefore be any substrate that comes into question for a super-repellent coating. Here, for example, fabric and textiles of any type, glass, ceramics and metals are deemed non-limiting as substrates. As applications, mention is made, for example, of making dirt-repellent fabric and textiles, the coating of spectacle lenses, not-to-be-frozen protective screens for the automotive industry, non-corrosive metals in technical pipe systems, the reduction of raw friction coefficients, etc.

The present invention allows for the provision of super-repellent substrate coatings based on a polymer foam, which, on the one hand, is intrinsically porous and is intrinsically highly fluorinated and low-energy on the other, whereby the super-repellent characteristic is ensured within the entire coating volume or across the entire thickness of the coating. In comparison to the aforementioned "top-down approaches" and "Bottom-up approaches", which require a second method step for one characteristic or another, the method according to the invention is neither complex on an equipment-based level nor limited to a certain effect depth. As has already been explained, the effect depth is understood as the substrate thickness, on which the super-repellent effect acts. According to the invention, the effect depth is identical to the effective overall thickness of the polymer-foam coating. Thus, it is not a surface but a volume effect. Only when the entire coating is fully removed is the super-repellent effect lost.

A slight abrasion of the surface regenerates the effect more than it is destroyed. Due to this self-regeneration, the polymer foam according to the invention does not require any elaborate treatment in the case of an abrasion, such as an inclusion of fluorination reagents into deeper surface layers, described by Jin et al. (Applied Materials & Interfaces 2013, 5, 485-488).

Figure 3:
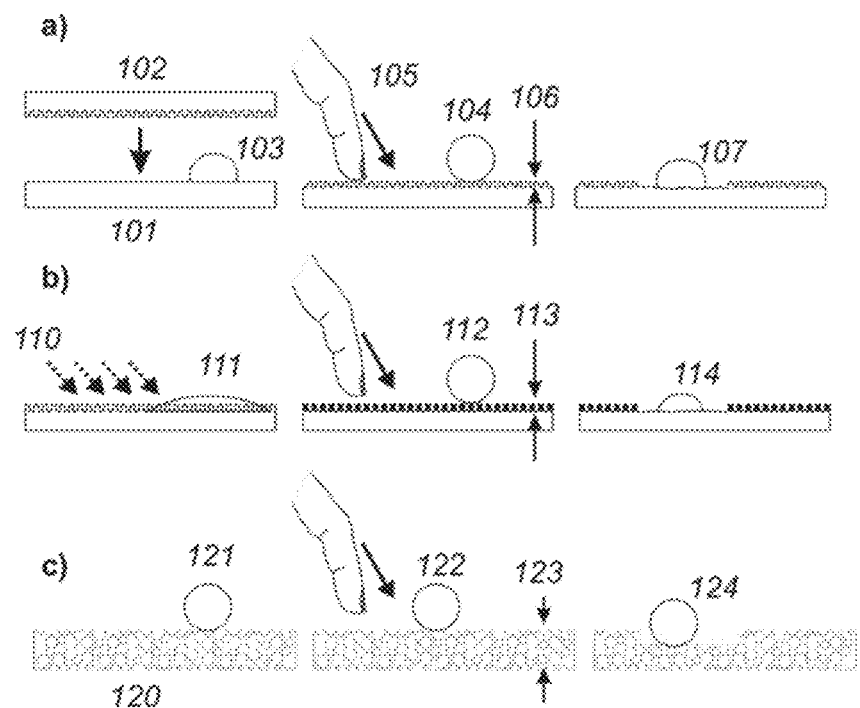
FIG. 3 shows the "top-down structuring" and "bottom-up structuring" in comparison to the polymer foam according to the invention. (a) Example of a "top-down structuring". A highly fluorinated substrate (101), for example, a highly fluorinated thermoplastic, is structured using a molding tool (102). A fluid (103) potentially forms a high contact angle on the unstructured substrate, however, no super-repellency occurs. After structuring takes place, a coating with an effect depth (106) of less than 10 to 100 μm forms, on which the super-repellent effect (104) is achieved. This layer is removed by mechanical abrasion (105). Now, no super-repellent effect is present for the liquid (107). (b) Example of a "bottom-up structuring". A substrate with a sufficient micro- or nanoscale roughness is fluorinated by means of a suitable process (110), whereby the free surface energy of the surface is reduced. No repelling of the liquid takes place on the native substrate (111). Sometimes, a significantly improved wetting may take place caused by capillary effects. After reducing the free surface energy, the surface is super-repellent up to an effect depth (113) of less than 10 to 100 μm (112). This layer can be easily removed due to mechanical abrasion, whereby the super-repellent effect is lost (114). (c) Polymer foam according to the invention. On the inherently highly fluorinated and low-energy and inherently nanoscale structured polymer foam (120), the fluid is natively repelled (121). Here, mechanical abrasion (122) can also remove material. However, the effect depth is equal to the total thickness of the coating (123). Thereby, a coating with an identical functionality is uncovered due to abrasion and the super-repellent is maintained (124).

In FIG. 3, the polymer foam according to the invention is compared with the "top-down approach" as well as the "bottom-up approach". Essentially, both latter-mentioned methods have the disadvantage that thy create effect depths of 10 to 100 µm in very abrasion-sensitive substrates. If the super-repellent effect is initially strongly pronounced on the processed surface, this effect can be destroyed due to simple abrasion, for example, due to scratching with a fingernail. The reason for this lies in the fact that a layer in the thickness of the effect depth is eroded by abrasion, whereby the underlying layer is uncovered. This layer generally has a maximum of one of the two characteristics required for the production of super-repellent surfaces: either the roughness via micro- or nanostructuring or the low free surface energy via a high degree of fluorination. Since the polymer foam according to the invention inherently comprises both characteristics—high degree of fluorination and nanostructuring throughout the entire volume—a mechanical abrasion cannot destroy the effect. Due to material erosion, a coating lying under the surface is uncovered, which has precisely the same characteristics as the eroded surface layer. The super-repellent effect is thereby not lost; therefore, it is abrasion-resistant.

Furthermore, the present invention has the following advantages with relation to the prior art:

No selective etching is necessary. This is of particular advantage with regard to all methods that initially produce a substrate, which consists of two materials, which create a suitable phase separation. Then, in a next step, one of the two materials is selectively removed. Above all, it is disadvantageous that the selective removal must take place after coating and thereby the substrate to be coated must be treated, for example, in a dipping bath. The method according to the invention does not have this disadvantage.

Furthermore, no handling of nanoparticles is necessary. This is beneficial particularly in terms of operational safety. Nanoparticles must be processed thus in suitable environment and using suitable breathing protection devices. If fluorinated nanoparticles are used, there is an additional risk due to the fluorination. Nanoparticles are respirable and it can be assumed that fluorinated nanoparticles represent a significant health burden. The method according to the invention is manageable without handling nanoparticles, thereby being safer to use and safer during operation.

In comparison to methods where a nanostructured surface is applied to the surface at a first step by means of a separation process and, at a second step, it is fluorinated (as an alternative, the separation of fluorinated nanostructured particles, wires, etc. is possible), the method according to the invention creates coatings with significantly elevated mechanical stability. This is justified in the fact that, within the method according to the invention, the effect depth extends to the entire thickness and is not limited to the penetration depth of the fluorination. Furthermore, a chemically cross-linked polymer in accordance with an embodiment of the present invention creates a significantly more stable coating on a mechanical level than the loose group of nanostructures in the form of bulk fillings or the like can achieve.

The method according to the invention principally allows for the free configuration of porosity, whereby coatings can be produced, which range from hydrophilic/oleophilic to hydrophobic/oleophilic, all the way to super-hydrophobic/super-oleophobic.

By means of the free configurability of the porosity, it is possible to produce substrate coatings, the porosity of which is so fine that the coating becomes optically transparent. This is a decisive advantage with regard to all those methods known within the prior art, which only provide whitish or opaque coatings.

In comparison to many methods known within the prior art, the method according to the invention only requires a small level of equipment-based effort, whereby the latter does not remain limited to laboratory use but is also suitable for large-scale application. This is a decisive advantage with relation to many other methods, which can only be carried out within a controlled laboratory environment. In particular, no elaborate thermal after-treatment is required, in particular, no high temperature process as is the case with calcination for example. Thus, the method according to the invention is also furthermore suitable for coating substrates that are thermally sensitive, such as fabrics and textiles.

The composition according to the invention favorably comprises no solids mixed in. By means of this, formulations are possible, which do not deposit or separate following long storage periods.

In contrast to many approaches described in the prior art, the method according to the invention allows for the super-repellent coating of a surface with almost any dimensions whatsoever, since the polymerization can be carried out very quickly and extensively.

Due to the freely configurable chemical cross-linking of the polymer foam produced in situ according to the invention, its chemical and mechanical resistance is significantly higher than is the case with highly fluorinated thermoplastics, which are very soft due to the lack of cross-linking and are therefore prone to an elevated level of material erosion due to abrasion.

EXAMPLES

The following examples are used as a further explanation of the present invention without being limited to it.

Example 1

0.214 mmol of a commercially available diacrylate derivative (Fluorolink MD 700) were mixed with 0.243 mmol 1H,1H,2H,2H perfluorooctanol, 0.449 mmol cyclohexanol and 0.006 mmol 2,2-dimethoxy-2-phenylacetophenone. The composition was cured under UV light (370 nm) for a duration of 2 min. The polymer foam obtained in this manner was dipped in isopropanol for 16 hours and then dried in an oven for 80° C. for one hour.

The polymer foam was super-hydrophobic, transparent with a slight turbidity and had a contact angle of 138° for dimethyl sulfoxide. Furthermore, the polymer foam between 400 and 800 nm had an optical transmission of 58.2% to 91.9% at a thickness of 0.25 mm.

As a reference, the non-porous form of the polymer foam had a free surface energy of 17.4 mN/m at a density of 1.692 g/mL (+/−0.112 g/mL, three measurements). In contrast, the porous form of the polymer foam had a free surface energy of 2.939 mN/m at a density of 1.660 (+/−0.030 g/mL, three measurements). The polymer foam had a fluorine contact of 47.6 mol %, wherein 0% of this was present as $CF_3$ groups and 100% of this was present as $CF_2$ groups. The density difference of the polymer foam with reference to the unfoamed bulk polymer was 1.9%. By means of scanning electron microscope images, it was verified that the cavities of the porous form of the polymer foam had dimensions of less than 1 μm.

Figure 4:
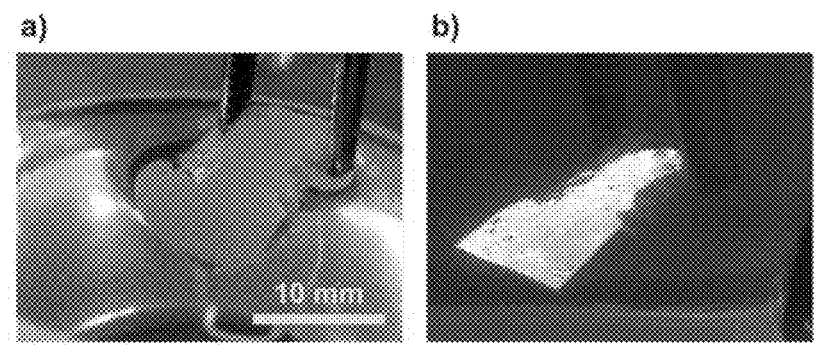
FIG. 4 shows the polymer foam according to the invention in contact with water. (a) When dipping into water, the high contact angle becomes evident. (b) Under water, the polymer foam keeps a reflecting layer of air at its surface. This ensures the required three-phase system.
Figure 5:
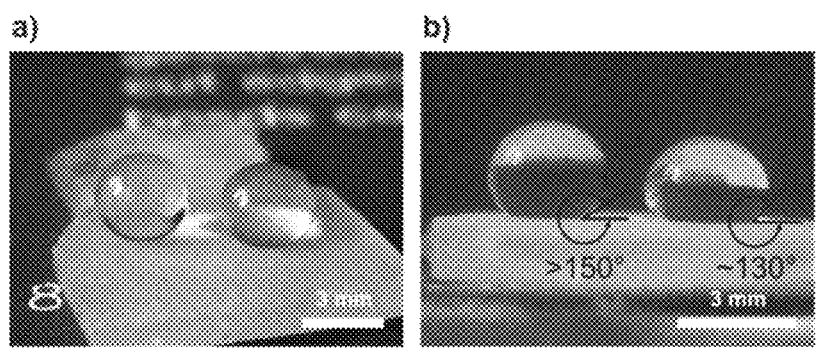
FIG. 5 shows the super-repellent effect of the polymer foam according to the invention with relation to (a) water and (b) oil (tetradecane). Contact angles ≥130° are achieved.
Figure 6:
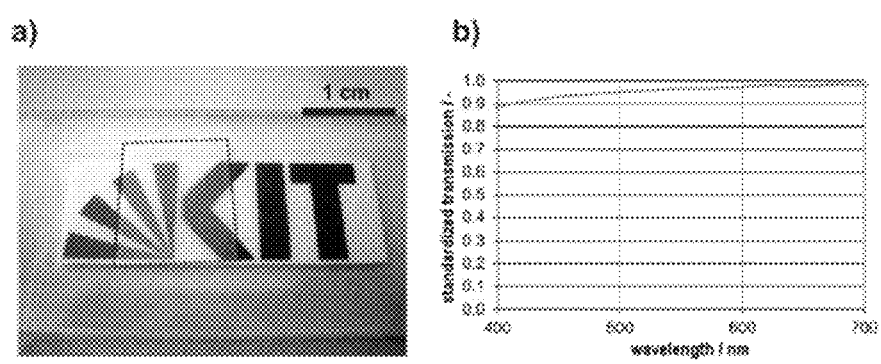
FIG. 6 shows an optically clear polymer foam in accordance with the present invention, the transparency of which can be configured by the dimensions of the cavities. (a) Coating with the polymer foam according to the invention (edge exaggerated) on the KIT logo. (b) optical transmission spectrum of the sample shown in (a). The sample appears to be optically transparent through the entire wavelength range represented.

The polymer foam obtained from Example 1 is shown in FIG. 4 to FIG. 6. FIG. 4 shows the polymer foam when dipping into water. The high contact angle with regard to water and the resulting strong bulging of the water surface can be seen. The polymer foam keeps a silvery-reflecting visible air layer on its surface under water. As has been already mentioned in the above, that air layer is required in order to ensure the three-phase system required for the super-repellent system. FIG. 5 shows the polymer foam with regard to its super-repellent characteristic with relation to water and oils, which can be traced back to the combination of its surface roughness due to nanostructuring and its low free surface energy due to the high degree of fluorination. FIG. 6 shows the polymer foam from example 1 with a nanoscale porosity which is so low that the substrate appears to be optically clear. The high level of optical transparency is evident both in the top view as well as in the spectroscopic analysis.

Example 2

A monomer mixture, consisting of 1.520 mmol of 2,2,3,3,4,4,5,5,6,6,7,7,8,8-pentadecafluorooctylmethacrylate and 0.787 mmol of 2,2,3,3,4,4,5,5-octafluorohexyldimethacrylate was mixed with 1.299 mmol of cyclohexanol, 2.049 mmol of 1H,1H,2H2H-perfluorooctanol, 0.086 mmol of 2,2-dimethoxy-2-phenylacetophenone and 0.581 mmol of acetone. The composition was cured under UV light (220 to 400 nm) for a duration of 5 min. The polymer foam obtained in this manner was dipped in isopropanol for one hour and then dried in an oven at 80° C. for one hour.

The polymer foam was super-hydrophobic, optically clear and had a contact angle of 102° for dimethyl sulfoxide. Furthermore, the polymer foam between 400 and 800 nm had an optical transmission of 79.9% to 91.4% at a thickness of 0.25 mm.

As a reference, the non-porous form of the polymer foam had a free surface energy of 17.47 mN/m at a density of 1.654 g/mL (+/−0.058 g/mL, three measurements). In contrast, the porous form of the polymer foam had a free surface energy of 2.140 mN/m at a density of 1.516 g/mL (+/−0.003 g/mL, three measurements). The polymer foam had a fluorine content of 53.4 mol %, wherein 20% of this was present as $CF_3$ groups and 80% of this was present as $CF_2$ groups. The density difference of the polymer foam with reference to the unfoamed bulk polymer was 8.3%. By means of scanning electron microscope images, it was verified that the cavities of the porous from of the polymer foam had dimensions of less than 1 μm.

The invention claimed is:

1. A method for producing a highly fluorinated nanostructured polymer foam, the method comprising the following steps:
    (a) curing a composition for producing the highly fluorinated nanostructured polymer foam by supplying heat or light, optionally on a substrate to be coated, the composition comprising the following components:
        at least one monomer which can be polymerized by supplying heat or light, wherein the fluorine content of the at least one monomer is at least 20 mol %;
        a polymerization initiator which initiates the polymerization of the at least one monomer by supplying heat or light; and
        a non-polymerizable porogen;
    (b) optionally dipping the polymer foam obtained in this manner into a solvent; and
    (c) drying the polymer foam treated in this manner,
    wherein the steps (a) to (c) are optionally repeated at least once,
    wherein the polymer foam has a density of at most 2.2 g/mL, an absolute foam expansion of at least 1% as well as a free surface energy of at most 12 mN/m, wherein the fluorine content is at least 20 mol % of a chemical composition of the polymer foam and wherein cavities with dimensions of at most 5 μm are homogeneously distributed throughout the entire volume of the polymer foam.

2. The method according to claim 1, wherein the polymer foam is dipped into an alcohol at step (b).

3. The method according to claim 1, wherein the drying of the polymer foam at step (c) is carried out at a temperature within the range of 50 to 100'C.

4. The method according to claim 1, wherein the volume percentage of t non-polymerizable porogen in the composition is at least 5%.

5. The method according to claim 1, wherein the at least one monomer is a diacrylate derivative, represented by the following general formula (I):

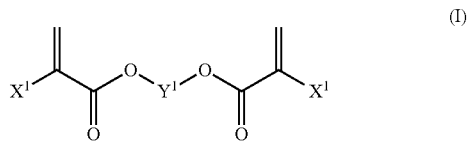

wherein $X^1$ is independently selected from the group consisting of hydrogen, methyl, monofluoromethyl, difluoromethyl and trifluoromethyl and $Y^1$ is a fluorinated saturated hydrocarbon residue which optionally comprises one or more ether groups, and/or a monoacrylate derivative, represented by the following general formula (II):

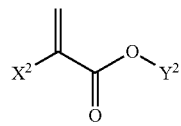
(II)

wherein $X^2$ is selected from the group consisting of hydrogen, methyl, monofluoromethyl, difluoromethyl and trifluoromethyl and $Y^2$ is a fluorinated saturated hydrocarbon residue which optionally comprises one or more ether groups.

6. The method according to claim 1, wherein at least 20% of the fluorine atoms contained in the polymer foam are present as $CF_3$ groups.

7. The method according to claim 1, wherein the polymer foam has a transmission of at least 50% within the wavelength range between 400 and 800 nm at a thickness of 0.25 mm.

8. A highly fluorinated nanostructured polymer foam with a density of at most 2.2 g/mL, an absolute foam expansion of at least 1% as well as a free surface energy of at most 12 mN/m, wherein the fluorine content is at least 20 mol % of a chemical composition of the polymer foam, wherein cavities with dimensions of at most 5 μm are homogeneously distributed throughout the entire volume of the polymer foam, and wherein the polymer foam is obtainable by a production method comprising the following steps:
(a) curing a composition for producing the highly fluorinated nanostructured polymer foam by supplying heat or light, optionally on a substrate to be coated, the composition comprising the following components:
at least one monomer which can be polymerized by supplying heat or light, wherein the fluorine content of the at least one monomer is at least 20 mol %;
a polymerization initiator which initiates the polymerization of the at least one monomer by supplying heat or light; and
a non-polymerizable porogen;
(b) optionally dipping the polymer foam obtained in this manner into a solvent; and
(c) drying the polymer foam treated in this manner, wherein the steps (a) to (c) are optionally repeated at least once.

9. The highly fluorinated nanostructured polymer foam according to claim 8, wherein the polymer foam is dipped into an alcohol at step (b).

10. The highly fluorinated nanostructured polymer foam according to claim 8, wherein the drying of the polymer foam at step (c) is carried out at a temperature within the range of 50 to 100° C.

11. The highly fluorinated nanostructured polymer foam according to claim 8, wherein the volume percentage of the non-polymerizable porogen in the composition is at least 5%.

12. The highly fluorinated nanostructured polymer foam according to claim 8, wherein the at least one monomer is a diacrylate derivative, represented by the following general formula (I):

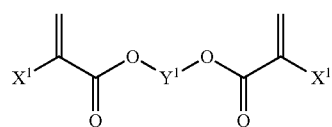
(I)

wherein $X^1$ is independently selected from the group consisting of hydrogen, methyl, monofluoromethyl, difluoromethyl and trifluoromethyl and $Y^1$ is a fluorinated saturated hydrocarbon residue which optionally comprises one or more ether groups, and/or a monoacrylate derivative, represented by the following general formula (II):

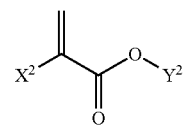
(II)

wherein $X^2$ is selected from the group consisting of hydrogen, methyl, monofluoromethyl, difluoromethyl and trifluoromethyl and $Y^2$ is a fluorinated saturated hydrocarbon residue which optionally comprises one or more ether groups.

13. The highly fluorinated nanostructured polymer foam according to claim 8, wherein at least 20% of the fluorine atoms contained in the polymer foam are present as $CF_3$ groups.

14. The highly fluorinated nanostructured polymer foam according to claim 8, wherein the polymer foam has a transmission of at least 50% within the wavelength range between 400 and 800 nm at a thickness of 0.25 mm.

* * * * *